(12) United States Patent (10) Patent No.: US 9,193,038 B2
Voronin (45) Date of Patent: Nov. 24, 2015

(54) METHOD FOR FORMING A CUTTING ELEMENT AND DOWNHOLE TOOLS INCORPORATING THE SAME

(71) Applicant: Smith International, Inc., Houston, TX (US)

(72) Inventor: Georgiy Voronin, Orem, UT (US)

(73) Assignee: Smith International Inc., Houston, TX (US)

( * ) Notice: Subject to any disclaimer, the term of this patent is extended or adjusted under 35 U.S.C. 154(b) by 399 days.

(21) Appl. No.: 13/707,549

(22) Filed: Dec. 6, 2012

(65) Prior Publication Data

US 2013/0146368 A1    Jun. 13, 2013

Related U.S. Application Data

(60) Provisional application No. 61/568,878, filed on Dec. 9, 2011.

(51) Int. Cl.
*E21B 10/46* (2006.01)
*B24D 3/10* (2006.01)
(Continued)

(52) U.S. Cl.
CPC .............. *B24D 3/10* (2013.01); *B24D 18/0009* (2013.01); *B24D 99/005* (2013.01); *E21B 10/46* (2013.01); *E21B 10/567* (2013.01)

(58) Field of Classification Search
CPC .......... E21B 10/46; B24D 3/005; B24D 3/02; B24D 3/04; B24D 3/06; B24D 3/18; B24D 3/00; B24D 11/00; B24D 18/00; C09K 3/14; C09C 1/68; B22F 3/15
USPC .......... 175/434, 433, 428, 425, 426; 264/666, 264/667; 419/1, 27, 53, 54, 46; 51/309; 75/313
See application file for complete search history.

(56) References Cited

U.S. PATENT DOCUMENTS 3,829,544 A    8/1974    Hall
4,224,380 A    9/1980    Bovenkerk et al.
(Continued)

FOREIGN PATENT DOCUMENTS

EP    2145870    9/2011
WO    2010140108    12/2010

OTHER PUBLICATIONS

Tardim, et al., A Novel Method for Obtaining Polycrystalline Diamond Cutters, Materials Science Forum, Material Science Forum, vol. 660-661, pp. 477-482, 2010.
(Continued)

*Primary Examiner* — Kenneth L Thompson

(57) ABSTRACT

Cutting elements include an ultrahard material body formed at high pressure and high temperature conditions in the absence of catalyzing material to provide a material microstructure comprising a matrix phase of bonded together ultrahard material particles and interstitial regions disposed throughout the matrix phase providing porosity of less than about 6 volume percent. The body may include a substrate attached thereto, and may include an infiltrant material disposed in a population of the interstitial regions. The body may have regions with different porosities, e.g., with a higher porosity region located adjacent a substrate interface and/or along a central region. The body may include more than one infiltrant, each located in different regions. The infiltrant may be introduced into the body during a separate high pressure/high temperature process. The body may include a region which extends a depth from a working surface that is substantially free of any infiltrant.

28 Claims, 6 Drawing Sheets

(51) Int. Cl.
  *B24D 18/00* (2006.01)
  *B24D 99/00* (2010.01)
  *E21B 10/567* (2006.01)

(56) References Cited

U.S. PATENT DOCUMENTS

| | | | |
|---|---|---|---|
| 4,289,503 A * | 9/1981 | Corrigan | 51/307 |
| 4,425,315 A | 1/1984 | Tsuji et al. | |
| 4,610,699 A | 9/1986 | Yazu et al. | |
| 5,137,665 A * | 8/1992 | Tarry | 264/666 |
| 5,250,086 A * | 10/1993 | McEachron et al. | 51/309 |
| 5,441,693 A * | 8/1995 | Ederyd et al. | 419/10 |
| 6,585,064 B2 | 7/2003 | Griffin et al. | |
| 6,617,271 B1 * | 9/2003 | Kodash et al. | 501/87 |
| 7,462,003 B2 | 12/2008 | Middlemiss | |
| 7,493,973 B2 | 2/2009 | Keshavan et al. | |
| 8,349,040 B2 * | 1/2013 | Bellin | 51/293 |
| 8,372,334 B2 * | 2/2013 | Voronin et al. | 419/11 |
| 8,979,956 B2 * | 3/2015 | Sani | 51/293 |
| 9,061,264 B2 * | 6/2015 | Frushour | 1/1 |
| 2005/0019114 A1 | 1/2005 | Sung | |
| 2006/0217258 A1 | 9/2006 | Zhao | |
| 2008/0022806 A1 | 1/2008 | Sumlya | |
| 2008/0066388 A1 | 3/2008 | Kuroda et al. | |
| 2008/0073127 A1 | 3/2008 | Zhan et al. | |
| 2008/0302579 A1 | 12/2008 | Keshavan et al. | |
| 2009/0071727 A1 | 3/2009 | Keshavan et al. | |
| 2009/0305039 A1 | 12/2009 | Sumiya | |
| 2010/0083583 A1 | 4/2010 | Sumiya et al. | |
| 2010/0112332 A1 | 5/2010 | Kuroda et al. | |
| 2010/0146865 A1 | 6/2010 | Sato et al. | |
| 2010/0236836 A1 | 9/2010 | Voronin | |
| 2011/0000715 A1 | 1/2011 | Lyons | |
| 2011/0195834 A1 * | 8/2011 | Banerjee et al. | 501/93 |
| 2013/0168157 A1 * | 7/2013 | Belnap | 175/428 |

OTHER PUBLICATIONS

Shige, et al., Sintering of Diamond Powder Electroless-Plated with Co Metal, Science and Technology of New Diamond, 1990, pp. 251-255.

Britun, et al., Deformation processes during high-pressure sintering of the diamond powders produced by catalytic synthesis. Journal of Materials Science, vol. 27, 1992, pp. 4472-4476.

Ekimov, et al., Sintering of a Nanodiamond in the Presence of Cobalt, Inorganic Materials, vol. 45(5), 2009, pp. 491-494.

Akaishi, et al., Synthesis of Sintered Diamond with High Electrical Resistivity and Hardness, Communications of the American Ceramic Society, vol. 70, No. 10, 1987, pp. C-237 to C-239.

PHLburg Technologies, Inc., Coating-Nanodiamonds, Oct. 2008 Issue, 4 pages.

Bochechka, et al., The Study of HP-HT Interaction between Co-Base Melts and Diamond Powders, High Pressure Chemical Engineering, 1996, pp. 457-463.

Osipov, et al, A contribution to the study of the diamond solid state sintering, Ceramica, vol. 49, 2003, pp. 151-157.

International Search Report & Written Opinion issued in PCT/US2012/068352 on Mar. 11, 2013; 12 pages.

* cited by examiner

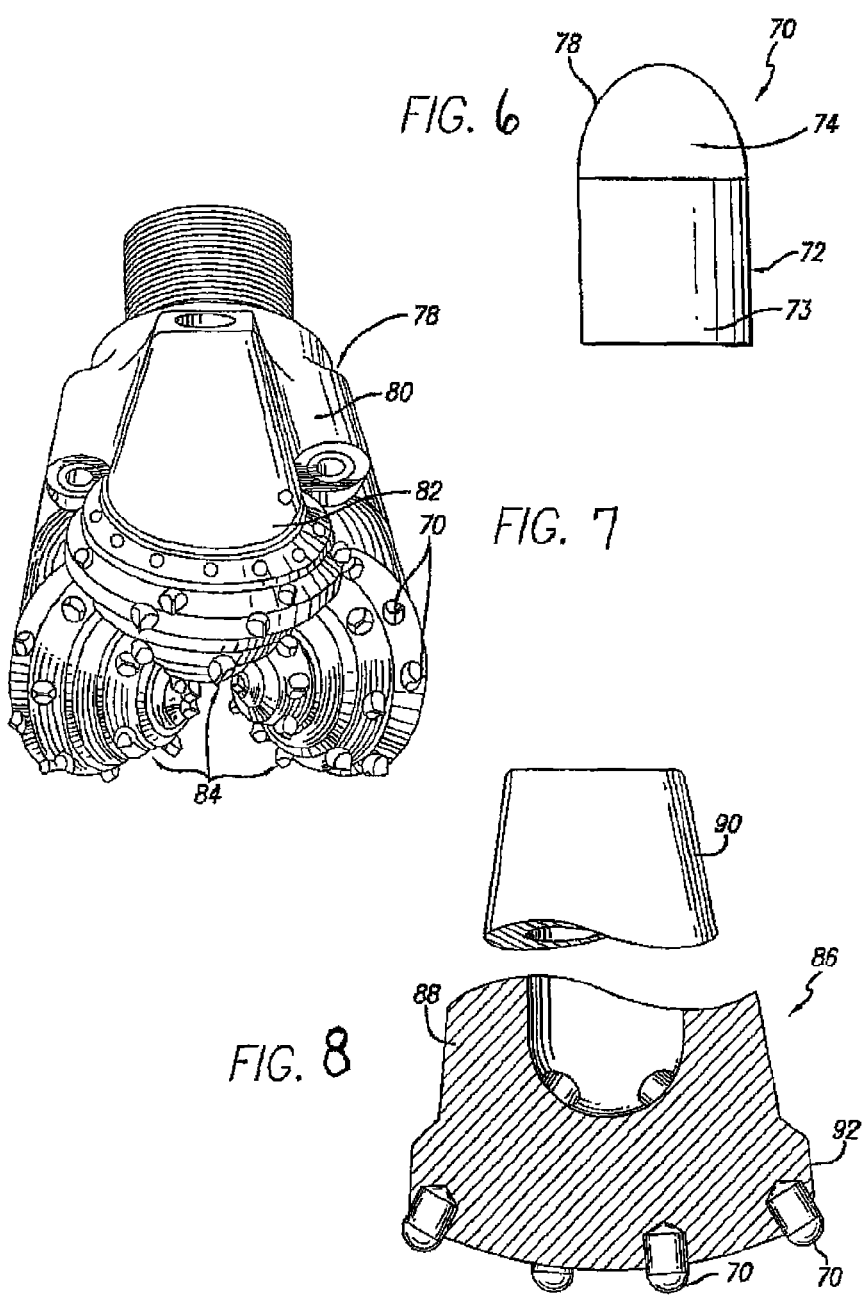

METHOD FOR FORMING A CUTTING ELEMENT AND DOWNHOLE TOOLS INCORPORATING THE SAME

RELATED PATENT APPLICATIONS

This application claims the benefit of a related U.S. Provisional Application Ser. No. 61/568,878 filed Dec. 9, 2011, entitled "METHOD FOR FORMING A CUTTING ELEMENT AND DOWNHOLE TOOLS INCORPORATING THE SAME," the disclosure of which is incorporated by reference herein in its entirety.

FIELD

The present disclosure relates to methods for forming cutting elements and drill bits incorporating such cutting elements.

BACKGROUND

The existence and use of ultrahard materials for forming tooling, cutting and/or wear elements is well known in the art. For example, polycrystalline diamond (PCD) is known to be used as cutting elements to machine and drill metals, rock, plastics and a variety of composite materials. Such known polycrystalline diamond materials have a microstructure characterized by a polycrystalline diamond matrix first phase, that generally occupies the highest volume percent in the microstructure and that has the greatest hardness, and one or more second phases, that generally consist of a solvent catalyst material used to facilitate the bonding together of diamond grains or crystals to form the polycrystalline matrix first phase during sintering.

PCD known in the art is formed by combining diamond grains (that will form the polycrystalline matrix first phase) with a suitable solvent catalyst material (that will form the second phase) to form a polycrystalline diamond body. The solvent catalyst material can be provided in the form of powder and mixed with the diamond grains or can be infiltrated into the diamond grains during high pressure/high temperature (HPHT) sintering. The PCD material is sintered at extremely high pressure/high temperature process conditions (e.g., 45 Kbar to 70 Kbar and 1300° C. to 1500° C.), during which time the catalyzing material promotes desired intercrystalline diamond-to-diamond bonding between the grains, thereby forming a PCD structure (body).

Catalyzing materials used for forming conventional PCD include solvent metals from Group VIII of the Periodic table of elements, with cobalt (Co) being the most common. Conventional PCD can comprise from about 85 to 94% by volume diamond and a remaining amount being the solvent metal catalyst material. The solvent catalyst material is present in the microstructure of the PCD material within interstices or interstitial regions that exist between the bonded together diamond grains and/or along the surfaces of the diamond crystals.

The resulting PCD structure produces enhanced properties of wear resistance and hardness, making PCD materials extremely useful in aggressive wear and cutting applications where high levels of wear resistance and hardness are desired. Many different Industries utilize such PCD materials for cutting, e.g., in the form of a cutting element, including automotive, oil and gas, aerospace, and mining to mention a few.

For use in the oil production industry, such PCD cutting elements such as shear cutters are configured for attachment to a subterranean drilling device, e.g., a fixed cutter drag bit. Thus, such PCD shear cutters are used as the cutting elements in fixed cutter bits that drill holes in the earth for oil and gas exploration. Such shear cutters generally comprise a PCD body that is joined to a substrate, e.g., a substrate that is formed from cemented tungsten carbide. The shear cutter is manufactured using an HPHT process that generally utilizes cobalt as a catalytic second phase material that facilitates sintering between diamond particles to form a single interconnected polycrystalline matrix of diamond with cobalt dispersed throughout the matrix.

The shear cutter is attached to the fixed cutter bit via the substrate, usually by a braze material, leaving the PCD body exposed as a cutting element to shear rock as the fixed cutter bit rotates. High forces are generated at the PCD/rock interface to shear the rock away. In addition, high temperatures are generated at this cutting interface, which shorten the cutting life of the PCD cutting edge. High temperature incurred during operation can cause the cobalt in the diamond matrix to thermally expand, wherein the cobalt has a higher coefficient of thermal expansion than that of the diamond, and wherein such thermal expansion mismatch may cause stresses and cracks to develop within the microstructure during use, thereby decreasing the performance service life of the PCD cutter. Further, the cobalt present in the in the PCD matrix may facilitate the conversion of diamond back to graphite at temperatures above 700° C., which will radically decrease the performance life of the cutting element.

Attempts in the art address the above-noted limitations have focused on the removal of the catalyzing material from the PCD body. In particular, such attempts have involved removing the catalyzing material from a portion of the diamond body or throughout the entire diamond body. While removing the catalyzing material from the PCD has reduced the unwanted effects of thermal mismatch and has improved thermal stability, resulting microstructure (comprising substantially the diamond matrix phase) lacks fracture toughness and strength. Thus, it is known in the art to infiltrate the treated PCD with materials capable of providing a closer thermal expansion match with the diamond, and/or that help to improve fracture toughness, and/or that do not promote the conversion of diamond to graphite during operation. Such described attempts have been useful in providing a PCD material having improved properties of thermal stability over conventional PCD.

However, certain end-use drilling applications call for PCD materials that not only have improved thermal stability, but also demonstrate improved properties of wear and abrasion resistance. Single-stage conventional HPHT processing produces a sintered PCD body having a maximum diamond volume fraction of 94 percent. The diamond volume fraction of a PCD material directly impacts the wear and abrasion resistance for such material, and thus the end-use performance and service life. While the above-described attempts, removing the catalyzing material from the PCD, have some impact of marginally improving the wear and abrasion resistance of the PCD material, the extent of such improvement ultimately is governed by the diamond volume content which remains unchanged.

It is, therefore, desired that PCD constructions and methods for making the same be developed in a manner that provides an improved degree of wear and abrasion resistance compared to conventional PCD materials. It is also desired that such PCD construction also be capable of providing improved thermal stability if so desired.

SUMMARY

Cutting elements as disclosed herein have an ultrahard material body characterized by a material microstructure comprising a matrix phase of bonded together ultrahard material particles and interstitial regions disposed throughout the matrix phase. The ultrahard material body is engineered having a porosity provided by the interstitial regions of less than about 6 volume percent, and in the range of from about 1 to 6 volume percent, based on the total volume of the ultrahard material body. The ultrahard material body includes an infiltrant material that is disposed into at least a portion of the interstitial regions of the ultrahard material body.

If desired, such ultrahard material body may have a first region having a first porosity and a second region having a second porosity that is different from the first porosity. In an example embodiment, the first region may have a lower porosity that the second region, and the first region may be positioned adjacent a working surface of the body and the second region may be positioned adjacent an interface with a substrate. Alternatively or additionally, the second region comprising the higher porosity may be disposed along a central region of the body.

In an example embodiment, the ultrahard material body used to form the cutting elements is made by subjecting a material consisting essentially of a plurality of ultrahard material particles to sufficiently high pressure and temperature conditions to form an ultrahard material body in the substantial absence of a catalyzing material. The pressure that is used during this process may be greater than about 70 Kbar, and greater than about 90 Kbar, and the temperature that is used during this process may be greater than about 1500° C., and in may be at least about 1700° C. In an example embodiment, the ultrahard material particles may be diamond grains or crystals, and the resulting ultrahard material body comprising the desired low porosity may be polycrystalline diamond.

In an example embodiment, the infiltrant material introduced into at least a region of the ultrahard material body during the high pressure and high temperature conditions after it has been formed. The infiltrant material can be provided as a constituent of a substrate that is positioned adjacent the ultrahard material body, and that is attached thereto during the process of being subjected to the high pressure and high temperature conditions. In an example embodiment, the infiltrant material may be selected from Group VIII metals, combinations, and alloys thereof. The high pressure and high temperature conditions used during the step of introducing the infiltrant may be lower than the high pressure and high temperature conditions used to form the ultrahard material body.

If desired, more than one infiltrant material can be introduced into the ultrahard material body. In an example embodiment, such additional infiltrant may be introduced into the ultrahard material body by placing a material containing the additional infiltrant material adjacent a surface of the ultrahard material body different from the first infiltrant. In an example embodiment, a first infiltrant may be introduced into a region of the ultrahard material body adjacent a substrate interface surface, and a second infiltrant may be introduced into a region of the ultrahard material body adjacent a working surface that is along a surface of the ultrahard material body opposite the substrate.

In an example embodiment, after the infiltrant material has been introduced, the ultrahard material body is treated to remove a portion of the infiltrant material from a region extending a depth from a working surface of the ultrahard material body, wherein the infiltrant material remains in another region of the body. Alternatively, during the process of introducing the infiltrant material, such infiltration is controlled so as to permit the introduction of infiltrant material into a first region of the body and so as to avoid introducing the infiltrant material into a second region, such that the second region is substantially free of the infiltrant material. In an example embodiment, the second region extends a depth from a working surface of the ultrahard material body.

BRIEF DESCRIPTION OF THE DRAWINGS

These and other features and advantages of cutting elements and downhole tools incorporating the same as disclosed herein will be appreciated as the same becomes better understood by reference to the following detailed description when considered in connection with the accompanying drawings wherein:

FIG. 6 is a side view of a cutting element as disclosed herein in the form of an insert;

FIG. 7 is a perspective view of a rotary cone drill bit comprising a plurality of the inserts of FIG. 6;

FIG. 8 is a cross-sectional side view of a percussion or hammer bit comprising a plurality of the inserts of FIG. 6;

DETAILED DESCRIPTION

Figure 1:
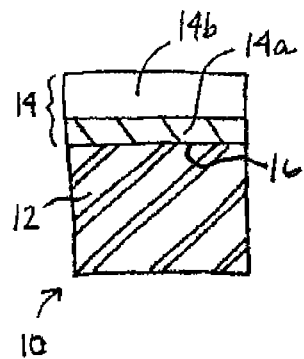
FIG. 1 is a cross-sectional side view of an example embodiment cutting element comprising a planar interface between different porosity regions as disclosed herein.

In one aspect, embodiments disclosed herein relate to improved methods for manufacturing cutting elements and downhole tools incorporating cutting elements prepared by such methods. Cutting elements prepared by such methods can also provide improved wear and abrasion resistance and thermal characteristics such as improved thermal stability when compared to conventional PCD materials, i.e., those that include a catalyzing material and that are made by conventional HPHT sintering process. Without wishing to be bound by theory, it is believed that such improved properties may be, at least in part, attributable to the achievement of stronger diamond-to-diamond bonding and reduced catalyzing material content.

As used herein, the term "catalyzing material" refers to a material that can be initially used to form the ultrahard material body (e.g., polycrystalline diamond body). The substantial absence of catalyzing material is understood to mean that no catalyzing material is added to the mixture of ultrahard material particles nor infiltrated from another source during initial formation/sintering of the ultrahard material body. It is understood that there may be catalyzing material impurities contained within the ultrahard material particles and the presence of such impurities may still be considered to provide for a substantial absence of catalyzing material.

As used herein, the term "infiltrant material" refers to a material that was not used during the initial formation/sintering of the ultrahard material body, but which may be subsequently introduced into unfilled pores and/or interstitial regions of the formed ultrahard material body.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, quantities, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of 1 to 4.5 should be interpreted to include not only the explicitly recited limits of 1 to 4.5, but also include individual numerals such as 2, 3, 4, and sub-ranges such as 1 to 3, 2 to 4, etc. The same principle applies to ranges reciting only one numerical value, such as "at most 4.5", which should be interpreted to include all of the above-recited values and ranges. Further, such an interpretation should apply regardless of the breadth of the range or the characteristic being described.

Cutting elements as disclosed herein comprise an ultrahard material body that is formed from a mixture consisting essentially of a plurality of ultrahard material particles. Ultrahard material particles may include diamond and/or boron nitride particles (typically cubic boron nitride "CBN"). The diamond particles may be selected from natural and/or synthetic diamond particles. Natural diamond particles may be preferred as they typically contain fewer impurities such as Group VIII metals (e.g., Fe—Ni or other alloys used in diamond synthesis). Suitably, the ultrahard material particles contain metallic impurities of less than about 8 percent by weight (wt. %), based on the total weight of the ultrahard material particles, in particular less than about 2 wt. %, more particularly less than about 0.5 wt. %. Suitably, the ultrahard material particles contain iron, nickel, cobalt, or their alloy in an amount of at most about 4 wt. %. The ultrahard material particles may form a mixture which has a particle size distribution that may be mono-modal or multi-modal, such as bi-modal, tri-modal, etc.

Diamond particles useful for forming a PCD body according to the present disclosure include diamond powders having an average particle size or diameter in the range of from sub-micrometer in size to 100 micrometers. Suitably, the diamond powders have an average particle size in the range of from about 5 to 40 micrometers. In an example embodiment, the diamond powder has an average particle size of approximately 15 micrometers. Similar particles sizes may also be useful for other ultrahard material particles such as CBN.

The ultrahard material particles may be provided in the form of a powder mixture. In an example embodiment, the powder may be mixed together by conventional process, such as by ball or attritor milling, for as much time as may be deemed necessary to ensure good uniform distribution, in particular when differently sized particles are used. Such mixing may introduce a small amount of metal carbide into the ultrahard material mixture, e.g., up to about 10 wt. %. However, such metal carbide is not believed to have an appreciable effect on the sintered body. The mixture of ultrahard material particles may preferably be cleaned, to enhance the sinterability of the powder by treatment at high temperature, in a vacuum or reducing atmosphere.

The mixture of ultrahard material particles may be placed in a pressure transmitting medium, such as a refractory metal can (e.g., niobium can), graphite structure, pyrophyllite or other suitable pressure transmitting structures or other suitable containers, and then placed within a suitable HPHT consolidation and sintering device. In an example embodiment, more than one mixture may be used to form different portions or regions of the ultrahard material body. A first mixture may be placed into the pressure transmitting medium in a first region followed by one or more additional mixtures in one or more additional regions. The mixture corresponding to each different region may be provided in the form of a powder or a green state part.

In an example embodiment, the one or more different regions of ultrahard material particles may be engineered such that the porosity may be different, e.g., greater, in one or more of the different regions, for example a region within the body near the interface surface between the ultrahard material body and a substrate (which provides the source of the infiltrant material). Such engineered porosity regions may provide for controlled infiltration of the ultrahard material body by the infiltrant material. For example, regions of greater porosity may be formed using smaller particle sizes than other regions FIG. 1 illustrates an example embodiment cutting element 10 comprising a substrate 12 bonded to an ultrahard material body 14 at an interface 16. The ultrahard material body 14 includes a portion or region 14a near the substrate having a greater porosity than portion or region 14b opposite the substrate. In this particular example, regions 14a and 14b are substantially planar. Such porosity differences can improve infiltration of the infiltrant material into the ultrahard material body during a second step of HPHT processing (as described in better detail below), and can control such infiltration.

In an example embodiment, where the cutting element comprises regions of different porosity, it is understood that the porosity of such regions is less than about 6 percent by volume. Thus, with reference to the embodiment illustrated in FIG. 1, the porosity of region 14a may be from about 4 to 6 percent by volume, and the porosity of region 14b may be from about 1 to 4 percent by volume, depending on the particular end-use application.

As it is most difficult to infiltrate a region around the axial center of the ultrahard material body, in an example embodiment, a central region of the ultrahard material body may be provided with a mixture of ultrahard material particles which will provide for a greater porosity than the surrounding regions. Such greater porosity provides for improved infiltration of the ultrahard material body by the infiltrant material.

Figure 2:
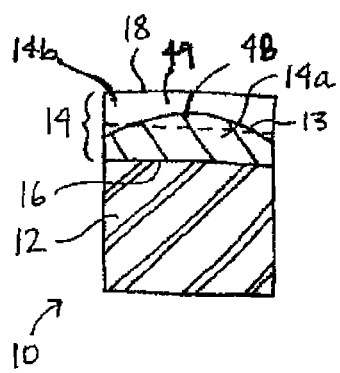
FIG. 2 is a cross-sectional side view of an example embodiment cutting element comprising a nonplanar interface between different porosity regions as disclosed herein.

FIG. 2 illustrates an example embodiment cutting element 10 comprising a central region 48 of the ultrahard material body 14 that is engineered having a greater degree of porosity than an upper region 49 of the body. The cutting element 10 includes a substrate 12 bonded to the ultrahard material body 14 at an interface 16. The ultrahard material body 14 includes a portion or region 14a near the substrate with a greater porosity than portion or region 14b opposite the substrate. In this example embodiment, the enhanced porosity region 14a is shaped as a dome, having a convex configuration, extending further into the ultrahard material body 14 in the central region 48 of the ultrahard material body 14 than at concentrically located surrounding regions. That is, the enhanced porosity region 14a is closer to the working surface 18 of the ultrahard material body at the center than at the outer edges. The domed region 14a in the ultrahard material body 14 can be formed by creating a depression (reversed dome or concave) in the ultrahard material powder mixture used to form region 14b prior to adding the ultrahard material powder mixture used to form region 14a. Alternatively, the depression may be formed in a green state part used to form region 14b and the mixture used to form region 14a added. Further, additional geometries may be used to form regions 14a and 14b.

After placement of the ultrahard material particles in the pressure transmitting medium, the assembly is subjected to the desired HPHT conditions to consolidate and sinter the ultrahard material particles into an ultrahard material body in the substantial absence of a catalyzing material. To be able to achieve sintering in the substantial absence of catalyzing material, ultra-high pressure and temperature conditions are utilized. In an example embodiment, the assembly may be subjected to an ultra HPHT process comprising a pressure of at least about 55 Kbar, suitably at least about 70 Kbar, more suitably at least about 80 Kbar, for example at least about 90 Kbar and a temperature of greater than about 1500° C., suitably at least about 1600° C., more suitably at least about 1700° C., for example at least about 1800° C. The assembly may be subjected to such ultra HPHT conditions for a period of time sufficient to sinter the ultrahard material particles, suitably from 0.2 to 10 minutes. In a preferred embodiment, the applied pressure may be approximately 90 Kbar, the applied temperature may be approximately 1800° C., and these conditions may be maintained for a period of approximately 1 minute. Such ultra HPHT conditions may be achieved using any suitable device capable of providing such ultra HPHT conditions, for example with a high pressure apparatus capable of simultaneously applying high temperatures. It should be understood that any press capable of consolidating and sintering the particles may be used.

One of ordinary skill in the art should appreciate after learning the teachings related to the present disclosure that multiple ultrahard material bodies may be formed in a single structure by using a suitable material to separate the mixtures used to form the individual bodies. Such suitable material may be any material that is capable of separating and effectively transmitting pressure/temperature to the ultrahard mixtures and which does not react or infiltrate the mixtures. For example, it could be graphite, refractory metals (e.g. W, Mo, Ta, Nb, Zr), their carbides, nitrides, borides, etc. Processing more than one ultrahard material body in a single structure can also improve process efficiencies.

Figure 3B:
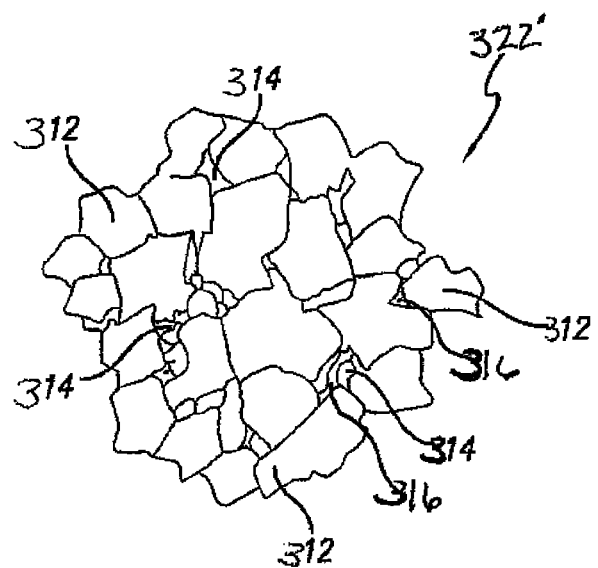
FIG. 3B schematically illustrates a region of a polycrystalline diamond body prepared as disclosed herein after an infiltration process.
Figure 3A:
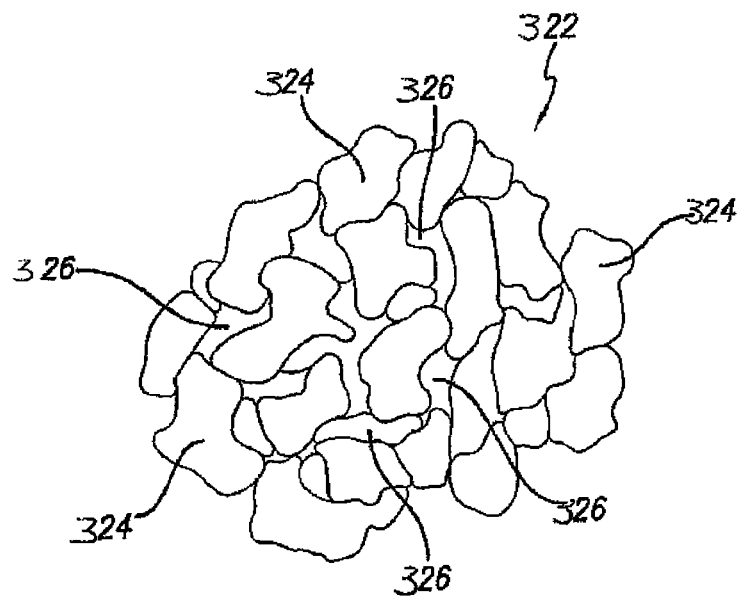
FIG. 3A schematically illustrates a region of a polycrystalline diamond body prepared as disclosed herein after an initial sintering process.

The assembly is removed from the HPHT device and the resulting ultrahard material body is removed from the assembly. The resulting ultrahard material body has a material microstructure consisting essentially of a matrix phase of bonded together ultrahard material particles and empty interstitial regions disposed substantially throughout the matrix phase providing a porosity in the body. FIG. 3A schematically illustrates a region 322 of a polycrystalline diamond body prepared according to the present disclosure after the initial sintering process. Region 322 includes a material microstructure consisting essentially of the plurality of bonded together diamond crystals/particles 324, forming the intercrystalline diamond matrix first phase, and a plurality of interstitial regions 326 that are substantially free of material, forming the voids or pores. The ultrahard material body has a porosity in the range of from greater than about 1 to less than about 6 percent by volume (vol. %), based on the total volume of the ultrahard material body. Suitably, the ultrahard material body has a porosity in the range of from about 2 to 5 vol. %.

Accordingly, as disclosed herein, the desired ultrahard material body is formed/sintered by the ultra HPHT process in the substantial absence of any catalyzing material to achieve a sintered structure having a reduced porosity of less than about 6 percent by volume, which translates to a high diamond volume content of 94 percent or more that is not otherwise obtainable by conventional HPHT processing of PCD, i.e., at conventional HPHT conditions in the presence of a catalyzing material. Such high diamond content being desired for the purpose of providing improved wear and abrasion resistance for meeting the rigorous demands of certain end use applications.

During a second step of processing, an infiltrant material may be then introduced into the empty interstitial regions (voids or pores) existing in the ultrahard material body formed according to the first step. Such infiltrant material has been defined hereinbefore. Suitably, the infiltrant material may include one or more of the following: refractory metals, non-refractory metals and their alloys, carbonates, silicon and silicon-containing compounds, Group IB, IIA, IIB metals of the Periodic table of elements (e.g., copper, magnesium, zinc), Group VIII metals of the Periodic table of elements (e.g., cobalt, nickel, iron, combinations and alloys thereof), titanium, germanium, and alloys and combinations of such materials. Suitably, cobalt may be used as an infiltrant material.

The voids or pores may be filled with the infiltrant material using a number of different techniques. Further all of the voids or only a portion or partial population of the voids in the ultrahard material body may be filled with the infiltrant material. In an example embodiment, the infiltrant material may be introduced into the ultrahard material body by liquid-phase infiltration under HPHT conditions during a second HPHT process. The infiltrant material and ultrahard material body may be placed in a suitable pressure transmitting medium as described hereinbefore, and subjected to high pressure/high temperature conditions sufficient to allow the infiltrant material to melt and migrate into the interstitial regions of the ultrahard material body. The conditions for this second HPHT process may be lower compared to the ultra HPHT conditions used in the first step to form/sinter the ultrahard material body.

In an example embodiment, the assembly may be subjected to a HPHT process comprising a pressure in the range of from about 35 to 65 Kbar, suitably in the range of from about 45 to 60 Kbar, and a temperature in the range of from about 1200 to 1650° C., suitably in the range of from about 1300 to 1550° C. The assembly may be subjected to such HPHT conditions for a period of time sufficient to introduce the infiltrant material into the ultrahard material body, suitably from 0.5 to 15 minutes. In a preferred embodiment, the applied pressure may be approximately 60 Kbar, the applied temperature may be approximately 1500° C., and these conditions may be maintained for a period of approximately 5 minutes. Alternatively, or in addition, other processes may be used to introduce the infiltrant material into the ultrahard material body, for example chemical processes, electrolytic processes, electrochemical processes, and the like.

At least a portion or a partial population of the interstitial regions (voids or pores) have an infiltrant material introduced therein. All or only a portion of each interstitial region in the ultrahard material body may be filled with an infiltrant material. The term "filled", as used herein, refers to the presence of an infiltrant material in the voids or pores of the ultrahard material body formed during the sintering of the body and is understood to mean that a substantial volume (i.e., greater than 50% v of the void or pore) of such voids or pores contain the infiltrant material. However, it is understood that there may also be a volume of interstitial regions within the same portion or region of the ultrahard material body that do not contain the infiltrant material and that the extent to which the infiltrant material effectively displaces the empty voids or pores will depend on such factors as the particular microstructure of the ultrahard material body, the effectiveness of the process used for introducing the infiltrant material, and the desired mechanical and/or thermal properties of the resulting ultrahard material body.

In an example embodiment, an infiltrant material fills interstitial regions throughout the ultrahard material body. In another example embodiment, complete migration of an infiltrant material throughout the ultrahard material body does not occur, in which case a region of the PCD body may not include an infiltrant material in the interstitial regions. For example, the region substantially devoid of an infiltrant material from such incomplete migration may extend from a region comprising infiltrant material to a surface of the ultrahard material body. FIG. 3B schematically illustrates a region 322' of a polycrystalline diamond body as disclosed herein after the infiltration process. Region 322' includes a material microstructure comprising the plurality of bonded together diamond crystals/particles 312, forming the intercrystalline diamond matrix first phase, and the infiltrant material 314 that may be disposed within the plurality of interstitial regions 316 that exist between the bonded together diamond crystals/particles and/or that may be attached to the surfaces of the diamond particles.

In an example embodiment, an infiltrant material may be provided in the form of a sintered part or a green-state part or a powder material that contains an infiltrant material and that may be positioned adjacent one or more surfaces of the ultrahard material body. Such source of infiltrant material may be a cemented metal carbide (e.g., a tungsten carbide—cobalt cermet material). For example, the source of infiltrant material may be a substrate that will be used to form a cutting element (e.g., a polycrystalline diamond compact).

In an example embodiment, an infiltrant material may be provided in the form of a powder, thin film, layer, disc or sheet, slurry, etc. For example, a disc of infiltrant material (e.g., cobalt) and/or particles of infiltrant material (e.g., silicon powder) may be positioned adjacent one or more surfaces of the ultrahard material body. When a slurry or the like (i.e., infiltrant material combined with a carrier such as a polymeric or organic carrier) is utilized to introduce infiltrant material, the slurry may be exposed to the ultrahard material body at elevated pressure to cause it to enter and fill at least a portion of the interstitial regions of the body. The ultrahard material body may then be subjected to elevated temperature for the purpose of removing the carrier therefrom, thereby leaving the infiltrant material disposed within the interstitial regions.

In an example embodiment, a substrate may be used as the source of infiltrant material to form the cutting element. Substrates useful in this regard may include substrates that may be used to form conventional PDC cutting elements, e.g., those formed from cermet material that contain a desired infiltrant material. As discussed previously, a tungsten carbide—cobalt cermet material may be used.

In an example embodiment, a substrate may be positioned adjacent the PCD body (formed as disclosed above in step 1 in the substantial absence of a catalyzing material at ultra HPHT conditions and having a specified reduced porosity). The substrate and PCD body may be placed within a pressure transmitting medium such as a refractory can. The assembly is subjected to HPHT conditions sufficient to cause the infiltrant material (e.g., cobalt) in the substrate to melt and infiltrate into and fill the voids or pores substantially throughout the PCD body.

In another example embodiment, a substrate (e.g., tungsten carbide—cobalt) may be positioned adjacent a surface of the PCD body (formed as disclosed above in step 1 in the substantial absence of a catalyzing material at ultra HPHT conditions and having a specified porosity) and one or more additional infiltrant materials may be positioned adjacent one or more other surfaces of the PCD body. For example, a substrate may be positioned adjacent an end face of the PCD body and an additional infiltrant material (e.g., silicon, titanium, copper (including their alloys)) may be positioned adjacent the opposite end face of the PCD body. The resulting cutting element has a PCD body containing a first region adjacent the substrate having interstitial regions containing cobalt and a second region adjacent the working surface of the PCD body having interstitial regions containing the additional infiltrant material. One skilled in the art would appreciate based on the teachings of the present disclosure that the size of the regions can depend on many factors such as the infiltrating conditions, the porosity content and distribution in the PCD body, the infiltrant materials, and the like.

In another example embodiment, a substrate (e.g., tungsten carbide—cobalt) may be positioned adjacent a surface of the PCD body (formed in the substantial absence of a catalyzing material and having a specified porosity) and tungsten carbide—cobalt or cobalt metal (including alloys thereof) may be positioned adjacent one or more other surfaces of the PCD body. For example a tungsten carbide—cobalt substrate may be positioned adjacent an end face of the PCD body and tungsten carbide—cobalt particles or cobalt metal may be positioned adjacent the opposite end face of the PCD body. Optionally, the sides of the PCD body may also have tungsten carbide—cobalt particles or cobalt metal positioned adjacent thereto. Surrounding the PCD body with the infiltrant material can provide for improved infiltration of the PCD body.

In another example embodiment, an intermediate material may be interposed between the substrate and the ultrahard material body, and an infiltrating material may be positioned adjacent one or more other surfaces of the body. The intermediate material may be formed from those materials that are capable of forming a suitable attachment bond between both the ultrahard material body and the substrate. In the event that the substrate material includes a binder material that is a Group VIII element, it may be additionally desired that the intermediate material operate as a barrier to prevent or minimize the migration of the substrate binder material into the ultrahard material body during the attachment or infiltration process.

Suitable intermediate materials include those materials that have a melting temperature that is below the melting temperature of any binder material in the substrate or may have a melting temperature above that of the HPHT process conditions, for example refractory metals (e.g., Mo, W, Nb, Ta, Zr) or their carbides. The intermediate layer may be provided in the form of a preformed layer, e.g., in the form of a foil or the like. The intermediate material may be provided in the form of a green-state part, or may be provided in the form of a coating that may be applied to one or both of the interface surfaces of the ultrahard material body and the substrate. In an example embodiment, the intermediate material may be applied by chemical vapor deposition, physical vapor deposition, atomic layer deposition and the like. It is to be understood that one or more intermediate layers may be used to achieve the desired bonding and/or barrier and or mechanical properties between the ultrahard material body and the substrate.

When the PCD body is infiltrated without the use of a substrate, a substrate may be attached separately from the HPHT infiltration process, such as by a separate HPHT process or by other attachment techniques such as brazing, welding, and the like.

Once the ultrahard material body has been infiltrated with an infiltrant material, it may then be treated to remove a portion of the infiltrant material therefrom. Alternatively, if the infiltrant material did not migrate completely through the ultrahard material body, a subsequent infiltrant removal step may not be necessary, or may be useful as a clean-up process to ensure a uniform infiltrant removal depth.

Figure 4A:
FIG. 4A is a cross-sectional side view of a polycrystalline diamond body filled with an infiltrant material.
Figure 4B:
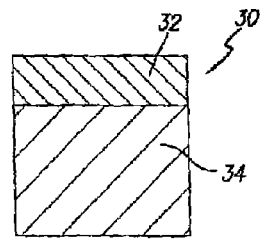
FIG. 4B is a cross-sectional side view of a polycrystalline diamond compact comprising a polycrystalline diamond body filled with an infiltrant material.

FIG. 4A illustrates the high diamond volume content PCD body 32 at a stage when it is filled with an infiltrant material, wherein the PCD body is free standing. However, as mentioned above, it is to be understood that the PCD body 32 filled with the infiltrant material at this stage of processing may be in the form of a compact construction 30 comprising a substrate 34 attached thereto, as shown in FIG. 4B.

Figure 4C:
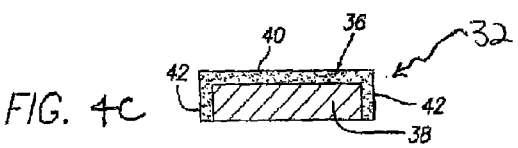
FIGS. 4C to 4F are cross-sectional side views of infiltrated polycrystalline diamond bodies as treated to remove the infiltrant material from one or more selected regions.

FIGS. 4C, 4D, 4E, 4F, and 4G all illustrate representative embodiments of high diamond volume content PCD bodies that have been filled with an infiltrant material, and subsequently treated to remove the infiltrant material from a region therefrom. FIG. 4C illustrates an embodiment of a PCD body 32 that includes a first treated region 36 that is substantially free of the infiltrant material, and a second untreated region 38 that includes the infiltrant material. The first treated region 36 extends a depth from surfaces 40 and 42. In this particular embodiment, the surfaces include an end face surface 40 and side surfaces 42 of the PCD body. The depth of the first treated regions may be the same or different for the surfaces 40 and 42 depending on the particular end-use application. Additionally, the extent of the side surfaces that include the first treated region may vary from extending along the entire side of the PCD body to extending only along a partial length of the side of the PCD body.

Figure 4D:
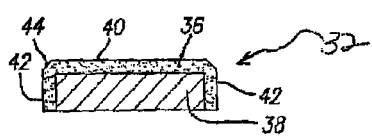

FIG. 4D illustrates an embodiment of the PCD body 32 that is similar to that illustrated in FIG. 4C, except that it includes a beveled or chamfered surface 44 that is positioned along an edge of the PCD body 32, between the end face surface 40 and the side surface 42, and that includes the first treated region. The beveled surface may be formed before or after the PCD body has been treated to form the first treated region 36. Suitably, the beveled region may be formed before the PCD body has been treated to form the first treated region, e.g., by grinding or the like.

Figure 4E:
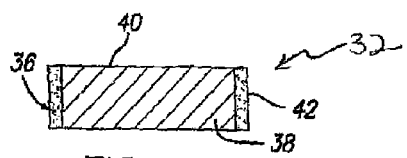

FIG. 4E illustrates another embodiment of the PCD body 32 that is similar to that illustrated in FIG. 4C, except that the first treated region 36 is positioned only along the side surface 42 of the PCD body 32 and not along the end face surface 40. Thus, in this particular embodiment, the first treated region is in the form of an annular region that surrounds the second untreated region 38. It is to be understood that the placement position of the first treated region relative to the second untreated region can and will vary depending on the particular end-use application. For example, the treated region may extend along the entire side surface of the body, or along only a partial portion of the side surface of the body.

Figure 4F:
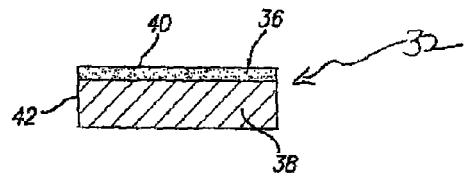

FIG. 4F illustrates another embodiment of the PCD body 32 that is similar to that illustrated in FIG. 4C except that the first treated region 36 is positioned only along the end face surface 40 of the PCD body 32 and not along the side surface 42. Thus, in this particular embodiment, the first treated region is in the form of a disk-shaped region on top of the second untreated region 38. Alternatively, the first treated region may extend along only a partial portion of the end face surface.

Figure 4G:
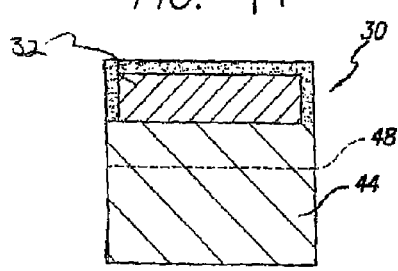
FIG. 4G is a cross-sectional side view of a cutting element comprising an in infiltrated diamond body as treated to remove the infiltrant material from one or more selected regions.
Figure 5:
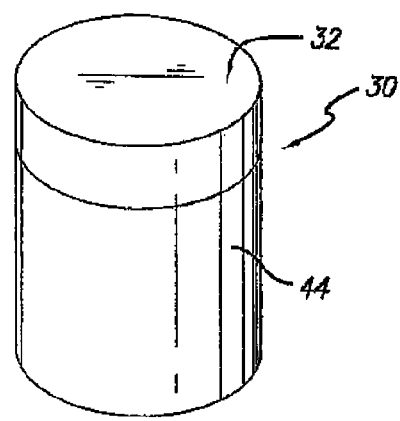
FIG. 5 is a perspective view of the cutting element of FIG. 4G.

FIG. 4G illustrates an embodiment of the PCD body 32 comprising the PCD body 32 as illustrated in FIG. 4C attached to a desired substrate 44, thereby forming a PDC cutting element 30. As discussed hereinbefore, the substrate 44 may be attached to the PCD body 32 during an HPHT process which is used to introduce the infiltrant material into the interstitial regions of the PCD body. Alternatively, the infiltrant material may be added to the PCD body independent of a substrate, in which case the desired substrate may be attached to the PCD body by either a further HPHT process or by brazing, welding or the like. FIG. 5 is a perspective view of the PDC cutting element of FIG. 4G.

As used herein, the term "removed" is used to refer to the reduced presence of the infiltrant material in the ultrahard material body and is understood to mean that a substantial portion of the infiltrant material no longer resides within the treated region of the ultrahard material body. However, it is to be understood that some small trace amounts of the infiltrant material may still remain in the microstructure of the ultrahard material body within the interstitial regions and/or adhered to the surface of the ultrahard material particles. Additionally, the term "substantially free", as used herein to refer to the remaining region of the ultrahard material body after the infiltrant material has been removed, is understood to mean that there may still be some trace small amounts of the infiltrant material within the body as mentioned above.

The quantity of infiltrant material remaining in the material microstructure after the ultrahard material body has been subjected to treatment to remove the same can and will vary on such factors as the efficiency of the removal process, and the grain size and content of the matrix material in the region(s) to be treated. In an example embodiment, the infiltrant material may be removed from a desired region of the ultrahard material body by a suitable process, such as by chemical treatment such as by acid leaching or aqua region bath, electrochemically such as by electrolytic process, by liquid metal solubility technique, by liquid metal infiltration technique that sweeps the existing second phase material away and replaces it with another. In an example embodiment, the infiltration material may be removed from a desired region of a PCD body by an acid leaching technique, such as that disclosed for example in U.S. Pat. No. 4,224,380, which is incorporated herein by reference.

Accelerating techniques for removing infiltrant material may also be used and may be used in conjunction with the leaching techniques noted above as well as with other conventional leaching processing. Such accelerating techniques include elevated pressures, and/or elevated temperatures and/or ultrasonic energy, and may be useful to decrease the amount of treatment time associated with achieving the same level of infiltrant material removal, thereby improving manufacturing efficiency.

In one embodiment, the leaching process can be accelerated by conducting the same under conditions of elevated pressure that may be greater than about 5 bar, and that may range from about 10 to 50 bar in other embodiments. Such elevated pressure conditions may be achieved by conducting the leaching process in a pressure vessel or the like. It is to be understood that the exact pressure condition can and will vary on such factors as the leaching agent that is used as well as the materials and sintering characteristics of the ultrahard material body.

In addition to elevated pressure, elevated temperatures may also be used for the purpose of accelerating the leaching process. Suitable temperature levels may be in the range of from about 90 to 350 ° C. in one embodiment, and up to 175 to 225° C. in another embodiment. In one or more embodiments, elevated temperature levels may range up to 300° C. It is to be understood that the exact temperature condition can and will vary on such factors as the leaching agent that is used as well as the materials and sintering characteristics of the ultrahard material body. It is to be understood that the accelerating technique may include elevated pressure in conjunction with elevated temperature, which would involve the use of a pressure assembly capable of producing a desired elevated temperature, e.g., by microwave heating or the like. For example, a microwave-transparent pressure vessel may be issued to implement the accelerated leaching process. Alternatively, the accelerating technique may include elevated temperature or elevated pressure, i.e., one or the other and not a combination of the two.

Ultrasonic energy may be used as an accelerating technique that involves providing vibratory energy operating at frequencies beyond audible sound, e.g., at frequencies of about 18,000 cycles per second and greater. A converter or piezoelectronic transducer may be used to form a desired ultrasonic stack for this purpose, wherein the piezoelectric crystals may be used to convert electrical charges to desired acoustic energy, i.e., ultrasonic energy. Boosters may be used to modify the amplitude of the mechanical vibration, and a sontotrode or horn may be used to apply the vibration energy. The use of ultrasonic energy may produce an 80 to 90 percent increase in leaching depth as a function of time as compared to leaching without using ultrasonic energy, thereby providing a desired decrease in leaching time and an improvement in manufacturing efficiency.

Although the interface between the PCD body and the substrate illustrated in FIGS. 4B and 4G are shown as having a planar geometry, it is understood that this interface may also have a non-planar geometry, e.g., having a convex configuration, a concave configuration, or having one or more surface features that project from one or both of the PCD body and substrate. Such a non-planar interface may be desired for the purpose of enhancing the surface area of contact between the attached ultrahard material body and substrate, and/or for the purpose of enhancing heat transfer therebetween, and/or for the purpose of reducing the degree of residual stress imposed on the ultrahard material body. Additionally, the ultrahard material body surfaces may be configured differently than that illustrated in FIGS. 4C-4G, having planar or non-planar end face and/or interface geometry.

Ultrahard material bodies of the present disclosure may have properties that change as a function of position within the ultrahard material body. For example, diamond density and/or diamond grain size may change as a function of position within a PCD body. The properties may change in a gradient or step-wise fashion moving away from a working surface of the PCD body. Further rather than using a single ultrahard material body, multiple ultrahard material bodies (e.g., 2, 3, 4 or more) may be combined to form the final ultrahard material body or table of the cutting element. Each such body may have the same or different properties such as particle size (e.g., diamond grain size), density (e.g., diamond density), and the like.

FIG. 6 illustrates an embodiment of a PDC cutting element provided in the form of an insert 70 used in wear or cutting applications on a roller cone drill bit or percussion or hammer drill bit used for subterranean drilling. Such inserts 70 may be formed from blanks comprising a substrate 72 formed from one or more of the substrate materials 73 disclosed above, and a PCD body 74 having a working surface 76 comprising a material microstructure made up of the PCD matrix phase, a first treated region that is substantially free of the infiltrant material within the interstitial regions, and a second untreated region within the PCD body comprising the infiltrant material disposed within interstitial regions. The blanks may be pressed or machined to the desired shape of a roller cone rock bit insert.

Although the insert of FIG. 6 is illustrated having a generally cylindrical configuration with a rounded or radiused working surface, it is to be understood that inserts formed from PCD constructions may be configured other than as illustrated and such alternative configurations are understood to be within the scope of the present disclosure.

FIG. 7 illustrates a rotary or roller cone drill bit in the form of a rock bit 78 comprising a number of the wear or cutting inserts 70 disclosed above and illustrated in FIG. 6. The rock bit 78 comprises a body 80 having three legs 82, and a roller cutter cone 84 mounted on a lower end of each leg. The inserts 70 may be fabricated according to the method described above. The inserts 70 may be provided in the surfaces of each cutter cone 84 for bearing on a rock formation being drilled. For a roller cone drill bit, a bit body may be provided and one or more legs attached thereto, which legs have a journal. A cone may be rotatably mounted to the journal and one or more inserts attached (e.g., by interference fit) to the cone.

FIG. 8 illustrates the inserts 70 described above as used with a percussion or hammer bit 86. The hammer bit comprises a hollow steel bit body 88 having a threaded pin 90 on an end of the body for assembling the bit onto a drill string (not shown) for drilling oil wells and the like. A plurality of the inserts 70 may be provided on the surface of a head 92 of the bit body 88 for bearing on the subterranean formation being drilled. Such bits may be manufactured by providing a bit body and attaching one or more inserts thereto.

Figure 9:
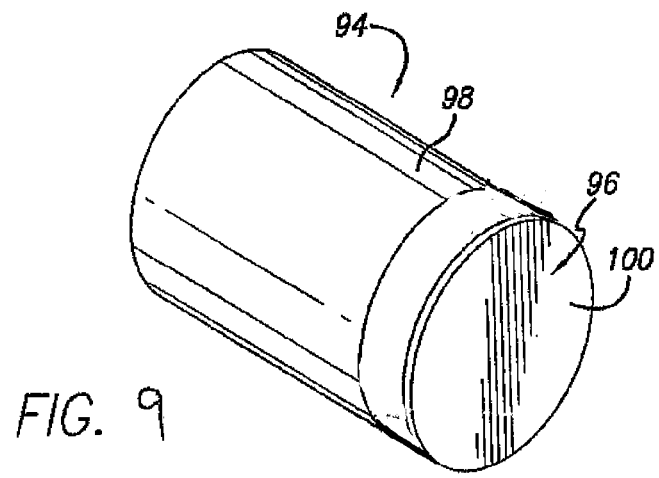
FIG. 9 is a perspective view of the cutting element as disclosed herein in the form of a shear cutter.

FIG. 9 illustrates a cutting element embodied in the form of a shear cutter cutting element 94 used, for example, with a drag or fixed cutter drill bit for drilling subterranean formations. The shear cutter 94 comprises a PCD body 96, comprising the polycrystalline diamond matrix phase, a first treated region that is substantially free of the infiltrant material within the interstitial regions, and a second untreated region within the PCD body comprising the infiltrant material disposed within interstitial regions. The PCD body is attached to a cutter substrate 98. The PCD body 96 includes a working or cutting surface 100.

Although the shear cutter in FIG. 9 is illustrated having a generally cylindrical configuration with a flat working surface that is disposed perpendicular to a longitudinal axis running through the shear cutter, it is to be understood that shear cutters formed from PCD constructions may be configured other than as illustrated and such alternative configurations are understood to be within the scope of the present disclosure.

Figure 10:
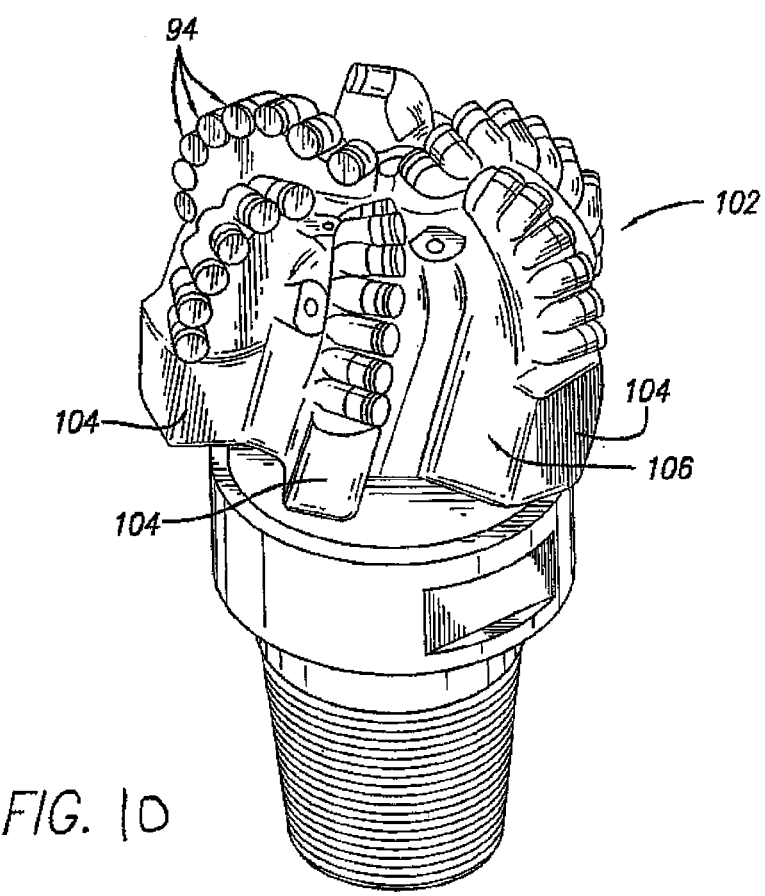
FIG. 10 is a perspective view of a drag or fixed cutter drill bit comprising a plurality of the shear cutters of FIG. 9

FIG. 10 illustrates a drag or fixed cutter drill bit 102 comprising a plurality of shear cutters 94 described above and illustrated in FIG. 9. The shear cutters are each attached to blades 104 that each extend from a head 106 of the drag bit for cutting against the subterranean formation being drilled. Such a bit may be manufactured by providing a bit body having cavities formed along the blades for receiving cutting elements. Bit bodies may be formed of steel or a matrix material. The matrix bit bodies may be formed by providing a mold (e.g., a graphite mold) and placing matrix material within the mold and infiltrating with a metal binder material. Displacements or formers may be placed within the mold to provide a cavity (e.g., a cutter pocket) for attachment of the cutting elements. Cutting elements may be attached by brazing, welding, mechanical techniques, and the like.

One of ordinary skill in the art should appreciate after learning the teachings of the present disclosure that various other tools may use the cutting elements of the present disclosure. Such tools may include reamers, stabilizers, hole openers, downhole tool sleeves (which may be welded to a bit).

While the cutting elements and tools incorporating the same have been described with respect to a limited number of embodiments, those skilled in the art having benefit of this disclosure, will appreciate that other embodiments can be devised which do not depart from the scope of such cutting elements and tools as disclosed herein. Accordingly, the scope of such cutting elements and tools should be limited only by the attached claims.

What is claimed is:

1. A method for manufacturing a cutting element comprising:
    subjecting a material comprising a plurality of ultrahard material particles to a first high pressure/high temperature condition to form a sintered ultrahard material body in the substantial absence of a catalyzing material, wherein the ultrahard material body has a material microstructure comprising a matrix phase of bonded together ultrahard material particles and interstitial regions disposed throughout the matrix phase providing a porosity in the range from about 1 to 6 volume percent based on the total volume of the ultrahard material body;
    removing the ultrahard material body from the first high pressure/high temperature condition; and
    introducing an infiltrant material into at least a portion of the interstitial regions of the ultrahard material body during a second high pressure/high temperature condition.

2. The method of claim 1, wherein during the step of subjecting, the pressure condition is greater than about 70 Kbar.

3. The method of claim 1, wherein during the step of subjecting, the pressure condition is at least about 90 Kbar.

4. The method of claim 1, wherein during the step of subjecting, the temperature condition is greater than about 1500° C.

5. The method of claim 2, wherein during the step of subjecting, the temperature condition is at least about 1700° C.

6. The method of claim 1, wherein the porosity of the ultrahard material body after the step of subjecting is in the range of from about 2 to 5 volume %, based on the total volume of the ultrahard material body.

7. The method of claim 1, wherein at least a portion of the ultrahard material particles comprise diamond particles.

8. The method of claim 1, wherein the infiltrant material is selected from Group VIII metals, combinations, and alloys thereof.

9. The method of claim 1, wherein the infiltrant material is selected from Groups IIA, IB, IIB metals, combinations, and alloys thereof.

10. The method of claim 1, wherein the infiltrant material is selected from the group consisting of Si, Ti, Ge, combinations, and alloys thereof.

11. The method of claim 1, wherein the infiltrant material is selected from carbonates of Group IA or IIA metals, their combinations or compounds which include them.

12. The method of claim 1, wherein after the step of removing, a material containing the infiltrant material is positioned adjacent a surface of the ultrahard material body.

13. The method of claim 12, wherein during the step of introducing, the high pressure/high temperature condition is sufficient to melt the infiltrant material and cause it to infiltrate into at least a portion of the interstitial regions of the ultrahard material body.

14. The method of claim 12 wherein during the temperature during the step of subjecting is higher than the melting temperature of the infiltrant material during the step of introducing.

15. The method of claim 12 wherein the temperature during the step of introducing is lower than the temperature during the step of subjecting.

16. The method of claim 12 wherein the pressure during the step of introducing is lower than the pressure during the step of subjecting.

17. The method of claim 12 wherein both the temperature and pressure during the step of introducing are lower than the pressure and temperature during the step of subjecting.

18. The method of claim 12 wherein the temperature is lower and the pressure is higher during the step of introducing than that of the corresponding temperature and pressure during the step of subjecting.

19. The method of claim 12 wherein the temperature is higher and the pressure is lower during the step of introducing than that of the corresponding parameters during the step of subjecting.

20. The method of claim 12 wherein both the temperature and pressure are higher during the step of introducing than that of the corresponding parameters during the step of subjecting.

21. The method of claim 12 comprising introducing at least one additional infiltrant material into the ultrahard material body.

22. The method of claim 12, wherein the at least one additional infiltrant material is introduced into the ultrahard material body by placing a material containing the additional infiltrant material adjacent a different opposite surface of the ultrahard material body.

23. The method of claim 1, further comprising treating the ultrahard material body to remove a portion of the infiltrant material from a region extending a depth from a working surface of the ultrahard material body, wherein the infiltrant material remains in another region of the body.

24. The method of claim 1, wherein during the step of introducing, controlling introduction of infiltrant material to provide a first region in the ultrahard material body comprising the infiltrant material, and a second region that is substantially free of the infiltrant material.

25. The method of claim 24, wherein the second region extends a depth from a working surface of the ultrahard material body.

26. The method of claim 1, wherein the ultrahard material body produced during the step of subjecting comprises a first region having a porosity that is different from a second region.

27. The method of claim 26, wherein the first region has a porosity that is greater than the second region, and wherein the first region is disposed along a central region of the body.

28. The method of claim 26, wherein the first region has a porosity that is greater than the second region, and wherein the first region is disposed along the infiltrant material or its source.

* * * * *